(12) United States Patent
Zhou et al.

(10) Patent No.: US 9,598,512 B2
(45) Date of Patent: Mar. 21, 2017

(54) ULTRA-HIGH MOLECULAR WEIGHT POLYETHYLENE RESIN AND ITS APPLICATION

(71) Applicant: CHINA PETROLEUM & CHEMICAL CORPORATION, Beijing (CN)

(72) Inventors: Jianyong Zhou, Shandong (CN); Xiaoqing Li, Shandong (CN); Liuzhong Li, Shandong (CN); Xiaolong Bi, Shandong (CN); Wenyi Li, Shandong (CN); Yongling Yu, Shandong (CN)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 0 days.

(21) Appl. No.: 14/437,211

(22) PCT Filed: Dec. 27, 2012

(86) PCT No.: PCT/CN2012/087685
§ 371 (c)(1),
(2) Date: May 27, 2015

(87) PCT Pub. No.: WO2014/063425
PCT Pub. Date: May 1, 2014

(65) Prior Publication Data
US 2015/0284484 A1    Oct. 8, 2015

(30) Foreign Application Priority Data

Oct. 22, 2012   (CN) .......................... 2012 1 0404447

(51) Int. Cl.
*C08F 10/02* (2006.01)
*C08F 110/02* (2006.01)
(Continued)

(52) U.S. Cl.
CPC ............. *C08F 110/02* (2013.01); *C08L 23/06* (2013.01); *D01F 6/04* (2013.01)

(58) Field of Classification Search
CPC . C08F 110/02; C08F 2500/01; C08F 2500/24
See application file for complete search history.

(56) References Cited

U.S. PATENT DOCUMENTS

| 4,071,674 A | 1/1978 | Kashiwa et al. |
| 8,173,775 B2 * | 5/2012 | Iwatsubo ........... C07K 14/4711 530/350 |

(Continued)

FOREIGN PATENT DOCUMENTS

| CN | 1033703 C | 1/1997 |
| CN | 1311831 A | 9/2001 |

(Continued)

OTHER PUBLICATIONS

CN 102050980 A; Li et al., May 11, 2011 (machine translation).*

*Primary Examiner* — Rip A Lee
(74) *Attorney, Agent, or Firm* — Novick, Kim & Lee, PLLC; Allen Xue

(57) ABSTRACT

Disclosed are an ultra-high molecular weight polyethylene resin for fiber and a preparation method thereof. The initial crystallinity of the resin is 60.5 to 90%, the volume average particle size is between 100 and 350 μm, the particle-size distribution is 1.0-2.1, the molecular weight is 2-7 million, the tensile breaking stress is 30 to 60 MPa, the bulk density of the resin is 0.10 to 0.50 g/cm$^3$, the infiltration time in the solvent decalin is 0.5 to 11 min, the decalin absorption amount of the resin is 2 to 50 g of decalin per 100 g of ultra-high molecular weight polyethylene resin, and the white oil absorption amount is 5 to 60 g of decalin per 100 g of ultra-high molecular weight polyethylene resin. The ethylene homopolymerization is performed using a slurry (Continued)

Figure 1:
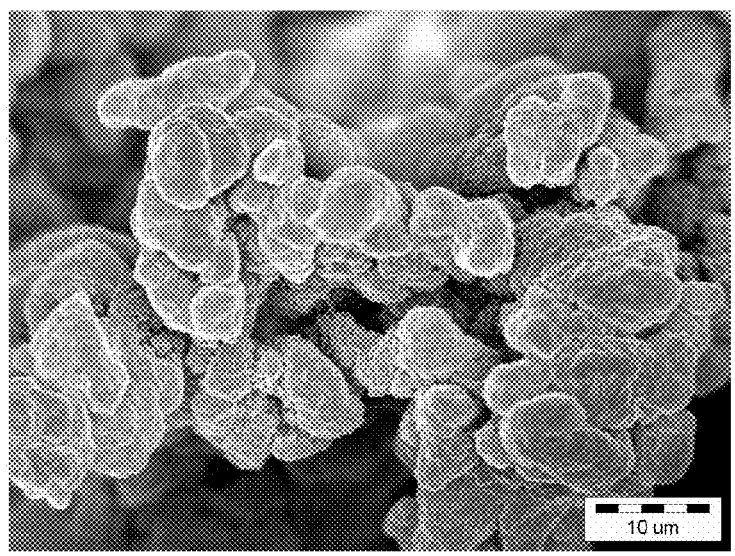

polymerization process in the presence of a main catalyst and a co-catalyst.

15 Claims, 2 Drawing Sheets

(51) Int. Cl.
*D01F 6/04* (2006.01)
*C08L 23/06* (2006.01)

(56) References Cited

U.S. PATENT DOCUMENTS

| | | | |
|---|---|---|---|
| 2006/0177643 A1* | 8/2006 | Kondo | B01D 67/0018 428/304.4 |
| 2009/0163679 A1* | 6/2009 | Do Nascimento | C08F 10/02 526/65 |
| 2013/0012375 A1* | 1/2013 | Li | C08F 210/02 502/5 |

FOREIGN PATENT DOCUMENTS

| | | | | |
|---|---|---|---|---|
| CN | 101421444 A | | 4/2009 | |
| CN | 102050980 A | * | 5/2011 | ............ C08K 5/36 |
| CN | 102863563 A | | 1/2013 | |
| CN | 102863564 A | | 1/2013 | |
| CN | 102952222 A | | 3/2013 | |
| CN | 103509139 A | | 1/2014 | |
| EP | 0277750 A2 | | 8/1988 | |
| JP | 60-192711 A | | 10/1985 | |
| JP | 2007297763 A | | 11/2007 | |

\* cited by examiner

ULTRA-HIGH MOLECULAR WEIGHT POLYETHYLENE RESIN AND ITS APPLICATION

TECHNICAL FIELD

The present disclosure relates to the field of polymer resin, and in particular to an ultra-high molecular weight polyethylene resin and its application in fiber spinning industry.

TECHNICAL BACKGROUND

Ultra-high molecular weight polyethylene fiber is the third generation high performance fiber emerged in the early 1990s. The relative molecular weight of ultra-high molecular weight polyethylene fiber is over 1 million, the molecular shape thereof is linear straight chain structure, and the degree of orientation thereof approaches 100%. Due to excellent mechanical properties and outstanding comprehensive performances of the ultra-high molecular weight polyethylene fibers, the application potential thereof is huge. Ultra-high molecular weight polyethylene fibers are applicable to both military use and civil use, and are widely used in various aspects, such as bulletproof products, explosion proof equipment, high strength cable and sports equipment, etc.

Ultra-high molecular weight polyethylene fibers are made by processing ultra-high molecular weight polyethylene resin. At present, ultra-high molecular weight polyethylene resin is mainly prepared by Ziegler low-pressure slurry process, i.e., the process of polymerizing ethylene at certain temperature and pressure and producing products with different molecular weights, using $\beta\text{-TiCl}_3/\text{Al}(C_2H_5)_2\text{Cl}$ or $\text{TiCl}_4/\text{Al}(C_2H_5)_2\text{Cl}$ as main catalyst, triethyl aluminum as co-catalyst, and saturated hydrocarbon at the temperature of 60 to 120° C. as dispersion medium.

Patent literature CN1033703 provides a method for preparing ultra-high molecular weight polyethylene, which can regulate the molecular weight of the ultra-high molecular weight polyethylene. According to the patent, ultra-high molecular weight polyethylene resin having good particle-size distribution and molecular weight that can be adjusted within a range from 0.6 to 6.1 million can be prepared under the temperature of 65 to 85° C., using $MgCl_2$ and $ZnCl_2$ composite supported titanium catalyst. According to this invention, the molecular weight of the product can be adjusted by regulating the Zn/Ti molar ratio. The catalyst used therein is a composite supported catalyst. The resin prepared through polymerization according to this patent is not used in fibers. The resin particle has smooth surface, and comprises no porous and gyms-like structure.

Patent literature CN1999809336 relates to a method for producing high-strength polyethylene fibers, wherein a polymerization mixture comprising from 99 to 50 parts by weight of (A) and from 1 to 50 parts by weight of (B), where (A) is high molecular weight polymer comprising mainly ethylene component and having a weight average molecular weight to number average molecular weight ratio (Mw/Mn) of no greater than 4 and an intrinsic viscosity η of no less than 5 dl/g, and (B) is an ultrahigh molecular weight polymer having an intrinsic viscosity at least 1.2 times that of high molecular weight polymer (A), is dissolved in solvent to a concentration of from 5% by weight to 80% by weight, then spun and drawn. The method according to this patent can efficiently manufacture high-strength polyethylene fibers having an intrinsic viscosity η of no less than 5 dl/g, a strength of no less than 20 g/d and an elasticity modulus of no less than 500 g/d. According to this patent, a mixture of two ethylene polymers having different intrinsic viscosities is used. For fibers made from the mixture, uniformity and stable performance can hardly be achieved, and the mechanical performances thereof are lower than those of ultra-high molecular weight polyethylene fibers.

Patent literature EP277750 provides an ultra-high molecular weight polyethylene resin for producing ultra-high strength fibers, having an intrinsic viscosity 11 in a range of 5 to 30 dl/g and a particle size in a range of 1 to 300 μm. Patent literature JP 2007297763 provides a method for producing high-strength polyethylene fibers, using high molecular weight polyethylene resin having an intrinsic viscosity greater than 8 dl/g. Patent literature CN 101421444 provides a spinning method for high strength polyethylene fibers that are difficult to obtain by conventional gel spinning methods. The high molecular weight polyethylene resin according to this patent has an intrinsic viscosity greater than 8 dl/g. When the polymer dope for spinning is prepared, ethanol compound, in which the resin is insoluble, is added. The mixture of decalin, poor solvent and ethanol compound is used as solvent, in which the polymer swells and dissolves. Thus, after spinning, high strength fibers can be obtained. Currently, during the production of fibers, ultra-high molecular weight polyethylene resin with relatively low intrinsic viscosity, i.e., relatively low molecular weight, is mainly used, which would significantly reduce the mechanical properties of the final fiber product.

At present, gel spinning process is mainly used for the production of ultra-high molecular weight polyethylene fibers. Gel spinning process requires the use of a specific solvent before the melt spinning and drawing, so that the entire or partial molecular chain of the ultra-high molecular weight polyethylene can be disentangled, thereby uniform solution can be formed. Therefore, the solubility of ultra-high molecular weight polyethylene particles in the solvent is critical, which determines the production efficiency and property of the fiber product to a large extent.

However, the solubility of ultra-high molecular weight polyethylene becomes poorer and poorer as the molecular weight thereof increases, and thus the production efficiency and the property of the fiber product would become poorer in the spinning process. On the other hand, although when the ultra-high molecular weight polyethylene has low molecular weight the solubility thereof would certainly increase, the tensile strength of the fiber product made therefrom would be far from satisfactory. The ultra-high molecular weight polyethylene in the prior art cannot have both good solubility and high molecular weight, and be spun into fiber with high stretching strength at the same time.

SUMMARY OF THE INVENTION

The objective of the present disclosure is to provide a use of ultra-high molecular weight polyethylene resin in fiber spinning, and to solve the problems that ultra-high molecular weight polyethylene resin at present is difficult to dissolve during fiber spinning, and has low strength, and that the fiber manufactured from the ultra-high molecular weight polyethylene resin is unstable in performance.

The present disclosure relates to an ultra-high molecular weight polyethylene resin, wherein the polyethylene resin has a viscosity average molecular weight in a range from 2 to 7 million, a volume average particle size in a range from 100 to 350 μm, a particle-size distribution in a range from 1.0 to 2.1, a tensile breaking stress in a range from 30 to 60

MPa, a bulk density of resin in a range from 0.10 to 0.50 g/cm$^3$, and an initial crystallinity in a range from 60.5 to 90%.

The decalin absorption amount of the ultra-high molecular weight polyethylene resin according to the present disclosure is in a range from 2 to 50 g per 100 g of ultra-high molecular weight polyethylene resin, and the white oil absorption amount of the ultra-high molecular weight polyethylene resin is in a range from 5 to 60 g per 100 g of ultra-high molecular weight polyethylene resin.

In preferred embodiments of the present disclosure: the initial crystallinity of the ultra-high molecular weight polyethylene resin is preferably in a range from 63 to 85%; an infiltration time of resin particles in solvent decalin is in a range from 0.5 to 11 min, preferably in a range from 1 to 8 min; the viscosity average molecular weight of the ultra-high molecular weight polyethylene resin is in a range from 2.5 to 6 million, preferably in a range from 3.5 to 5.5 million; the average particle size of the ultra-high molecular weight polyethylene resin is preferably in a range from 150 to 250 µm; the particle-size distribution of the ultra-high molecular weight polyethylene resin is in a range from 1.2 to 2.0, preferably in a range from 1.4 to 1.9; the bulk density of the ultra-high molecular weight polyethylene resin is in a range from 0.20 to 0.45 g/cm$^3$, preferably in a range from 0.20 to 0.35 g/cm$^3$; and the tensile breaking stress of the ultra-high molecular weight polyethylene resin is in a range from 32 to 60 MPa, preferably in a range from 35 to 60 MPa. Good tensile breaking stress can well facilitate the thermal drawing of fibers.

The initial crystallinity according to the present disclosure refers to the crystallinity directly determined in a process, in which nascent state polymer particles generated in the reactor haven't been through a thermal process, and the thermal history is not eliminated. It represents the extent of entanglement of the nascent state ultra-high molecular weight polyethylene resin particles. In addition, the solubility of ultra-high molecular weight polyethylene in solvent is related to the extent of entanglement of the macromolecules thereof. The more entangled the ultra-high molecular weight polyethylene macromolecules, the lower the initial crystallinity of the resin particles, and the poorer solubility of the resin particles in the solvent. On the contrary, the less entangled, the higher the initial crystallinity of the resin particles, and the better solubility of the resin particles in the solvent. Therefore, the ultra-high molecular weight polyethylene resin with higher initial crystallinity also has better solubility.

The initial crystallinity of the ultra-high molecular weight polyethylene resin according to the present disclosure is in a range from 60.5 to 90%, which can effectively shorten the time of dissolution. If the initial crystallinity is lower than 60.5%, the extent of entanglement is high, and thus the solubility is poor. In this case, it is difficult for the resin to be made into fibers. If the initial crystallinity is higher than 90%, the production cost is high and the process is complex. In this case, the production is difficult to be implemented.

The decalin absorption amount of the ultra-high molecular weight polyethylene resin according to the present disclosure is in a range from 2 to 50 g per 100 g of ultra-high molecular weight polyethylene resin, and the white oil absorption amount of the ultra-high molecular weight polyethylene resin is in a range from 5 to 60 g per 100 g of ultra-high molecular weight polyethylene resin.

In dry spinning process, the ultra-high molecular weight polyethylene resin is infiltrated in decalin at first. If the ultra-high molecular weight polyethylene resin can fully absorb dacalin, the solubility thereof during spinning can be better, which can facilitate the spinning. In this case, the fibers obtained can have higher strength and better uniformity. If each 100 g ultra-high molecular weight polyethylene resin absorbs less than 2 g of decalin, the resin cannot be sufficiently dissolved, and thus the spinning effect would hardly be satisfactory. If each 100 g ultra-high molecular weight polyethylene resin absorbs more than 50 g of decalin, the process would be difficult to be implemented and industrially uneconomical. In wet spinning process, mineral oil is used as solvent. If each 100 g ultra-high molecular weight polyethylene resin absorbs less than 5 g white oil, the resin cannot be sufficiently dissolved, and thus the spinning effect would hardly be satisfactory. If each 100 g ultra-high molecular weight polyethylene resin absorbs more than 60 g white oil, the process would be difficult to be implemented and industrially uneconomical.

The ultra-high molecular weight polyethylene resin particles according to the present disclosure comprise porous and gyms-like structures. Due to the wide and deep cracks on the surfaces of the particles, the solvent can rapidly penetrate into the particles during spinning and accelerate the dissolution of the particles. In this case, the infiltration time of the resin particles in solvent decalin according to the present disclosure, which is in a range from 0.5 to 11 min, and preferably in a range from 1 to 8 min, is shorter as compared with the prior art. The infiltration time is also an indicator for evaluating the solubility of the ultra-high molecular weight polyethylene resin. If the infiltration time is shorter than 0.5 min, it means that the resin is easily soluble in solvent and usually has small molecular weight, and thus the fibers made from the resin would have low strength. If the infiltration time is longer than 11 min, it means that the resin is difficult to dissolve. In this case, deficit points are easily formed and decollation would easily occur during the manufacturing of fibers.

The molecular weight of the ultra-high molecular weight polyethylene resin is in a range from 2 to 7 million, preferably in a range from 2.5 to 6 million, and more preferably in a range from 3.5 to 5.5 million. If the molecular weight is overly high, such as higher than 7 million, because the polymer is difficult to dissolve in the solvent and the dissolution time is too long, the processing of the fibers would be highly difficult. If the molecular weight is too low, such as lower than 2 million, the problems of decollation and lowered fiber strength would occur, and the fiber product prepared can hardly be satisfactory.

The process of fiber preparation is complex, and requires highly of the particle morphology of the ultra-high molecular weight polyethylene resin. The particle morphology, particle size, and the particle-size distribution of the ultra-high molecular weight polyethylene resin will affect the dissolving rate of the resin particles in the solvent, thereby influencing the production efficiency, and even the product performance. During fiber production, if there are large particles in the resin, which might only swell instead of dissolving when most particles have sufficiently dissolved, the large particles would become deficit points during spinning. The particle morphology of a sample can be analyzed through photomicrography technology (see FIGS. 1-4 of the present disclosure). The resin according to the present disclosure is characterized by uniform particles, with modest average particle size being in a range from 100 to 350 µm, preferably in a range from 150 to 250 µm, as well as narrow distribution, with the average particle-size distribution being in a range from 1.0 to 2.1, preferably in a range from 1.2 to 2.0, and more preferably in a range from 1.4 to 1.9. In this case, homogeneous dissolution of the resin in the spinning solvent can be facilitated. If the average particle size is larger than 350 μm, the time for dissolution would be greatly increased. If the average particle size is smaller than 100 μm, the operative difficulty for resin production would be significantly increased due to relatively large number of fine particles in the resin. When the particle-size distribution is smaller than 1.0, the process required for resin production would be harsh, and the difficulty of production would increase. When the particle-size distribution is larger than 2.1, the time of dissolution of the resin in the solvent would be inconsistent, thereby the uniformity of the spinning solvent would be influenced, the spinning process would be unstable, and decollation would easily occur.

Good tensile breaking stress can well facilitate the thermal drawing of fibers. The tensile breaking stress of the ultra-high molecular weight polyethylene resin according to the present disclosure is in a range from 32 to 60 MPa. If the tensile breaking stress is lower than 32 MPa, the strength of the fibers would be reduced, and if the tensile breaking stress is higher than 60 MPa, filamentation is difficult to be carried out during the multistage drawing phase in the spinning process.

The ultra-high molecular weight polyethylene resin according to the present disclosure has a bulk density that can be adjusted in a broad range, which is from 0.10 to 0.50 $g/cm^3$. If the bulk density is lower than 0.10 $g/cm^3$, the resin would be too loose for the packaging and material feeding during production. If the bulk density is higher than 0.50 $g/cm^3$, the resin would be too compact, and thus the infusion of solvent therein will be influenced.

The present disclosure further provides a method for preparing an ultra-high molecular weight polyethylene resin. In the presence of a main catalyst and a co-catalyst, ethylene is homopolymerized through a slurry polymerization process, thereby obtaining the ultra-high molecular weight polyethylene resin. Specifically, the method for preparing the ultra-high molecular weight polyethylene resin is as follows.

(1) Preparation of Main Catalyst

In inert atmosphere, magnesium halide is dispersed in an inert solvent. Alcohol is added for reaction, thereby forming magnesium halide-alcohol adduct solution or dispersoid. Subsequently, alkyl aluminum halide is added to react with the magnesium halide-alcohol adduct, forming an intermediate product. The intermediate product is treated with ultrasound in an ultrasonic device. A titanium compound is added for a Ti loading reaction. Afterwards, said Ti loading reaction mixture is treated with ultrasound in the ultrasonic device. Finally, solid particles are recycled, and catalyst for preparing the ultra-high molecular weight polyethylene is obtained.

(2) Preparation of Ultra-High Molecular Weight Polyethylene

After nitrogen purging in a polymerization reactor, solvent is added therein, and stirring is started. Then, co-catalyst and main catalyst are added in sequence, and the temperature in the reactor is raised to a certain polymerization temperature. Vinyl monomer is injected into the reactor, and the pressure in the reactor is raised to certain polymerization pressure. In the meantime, the pressure and temperature in the reactor are maintained constant. After the reaction proceeds for a period of time, resin particles generated suspend in the solvent, thereby forming polymer slurry in the solvent. Finally, after the solvent is removed from the polymer slurry, the ultra-high molecular weight polyethylene resin required is obtained.

In the reaction, the co-catalyst can be one or more aluminum alkyls. The ratio of the main catalyst to the co-catalyst is selected so that Al/Ti molar ratio thereof is in a range of 30~1000:1.

In step (1), the general formula for the Ti compound is $Ti(OR^3)_nX_{4-n}$, wherein $R^3$ is an alkyl comprising 1 to 6 carbon atoms, X is halogen, preferably chlorine or bromine, and more preferably chlorine, and n is an integer selected from 0 to 4.

In step (1), the Ti loading reaction should be controlled under the temperature in a range from 0 to 130° C. for 10 min to 5 hr.

In step (2), the solvent for the polymerization is selected from aliphatic hydrocarbon compound or aromatic hydrocarbon compound comprising 5 to 15 carbon atoms, such as pentane, hexane, heptanes, octane, nonane, decane, 6# solvent oil, 120# solvent oil, methylbenzene, or xylene, wherein the solvent is preferably selected from hexane, heptanes, or 6# solvent oil, and more preferably 6# solvent oil.

In step (2), the co-catalyst can be one or more aluminum alkyls, such as trimethyl aluminum, triethyl aluminum, triisopropyl aluminum, triisobutyl aluminum, tri-n-hexyl-aluminum, diethylaluminum chloride, dibutylaluminum chloride, dibutylaluminum bromide, or other similar compounds. Preferably, the co-catalyst is triethyl aluminum. The co-catalyst can be one type of aluminum alkyl, or a combination of multiple aluminum alkyls.

The present disclosure further relates to the application of an ultra-high molecular weight polyethylene resin as raw material in the processing of polyethylene fibers.

The fibers obtained through spinning, using the ultra-high molecular weight polyethylene resin according to the present disclosure as raw material, have high tensile strength of 800 cN/dtex or more.

The main catalyst should be used in combination with the co-catalyst aluminum alkyls. The ratio of main catalyst to co-catalyst can be controlled in a range of Al/Ti molar ratio of 30~1000:1, preferably in a range of 50~400:1.

In step (2), the reaction temperature is in a range from 30 to 100° C., preferably in a range from 50 to 85° C.

In step (2) the reaction pressure is in a range from 0.1 to 1.6 MPa, preferably in a range from 0.4 to 0.8 MPa.

In step (2), the time of polymerization reaction is in a range from 0.5 to 10 hr, preferably in a range from 1 to 8 hr.

In step (2), the speed of stirring during the polymerization is in a range from 60 to 500 rpm. For a reactor with relatively small volume, stirring speed can be higher. However, for a reactor having a volume of more than 1 $m^3$, the stirring speed should be lower.

The stirring paddle used in the present disclosure can be either a grid stirrer or an anchor stirrer. In order to enhance the cooling effect of the reactor, circulating water can also be fed into the paddle.

The catalyst according to the present disclosure can be fed to the reactor in a form of dry powder. Alternatively, the catalyst can be premixed with the polymerization solvent and then fed to the reactor.

As compared with the prior art, the present disclosure had the following advantages.

(1) The ultra-high molecular weight polyethylene resin according to the present disclosure has a relatively high initial crystallinity, which is in a range from 60.5 to 90%, a volume average particle size in a range from 100 to 350 nm, a molecular weight in a range from 2 to 7 million, a tensile breaking stress in a range from 30 to 60 MPa, and a bulk density of resin in a range from 0.10 to 0.50 $g/cm^3$. The resin particles comprise porous and gyms-like structures. The decalin absorption amount of the resin is in a range from 2 to 50 g per 100 g of ultra-high molecular weight polyethylene resin, and the white oil absorption amount of the resin is in a range from 5 to 60 g per 100 g of ultra-high molecular weight polyethylene resin. The infiltration time of resin particles in solvent decalin is in a range from 0.5 to 11 min.

(2) The ultra-high molecular weight polyethylene resin is characterized by being excellent in fiber spinning performance, rapid in swelling and dissolution, and stable in spinning and thermal stretching processes. The fibers prepared have characteristics of high modulus and high strength, wherein the modulus ≥25 cN/dtex, and the strength ≥800 cN/dtex.

BRIEF DESCRIPTION OF THE ACCOMPANYING DRAWINGS

Figure 2:
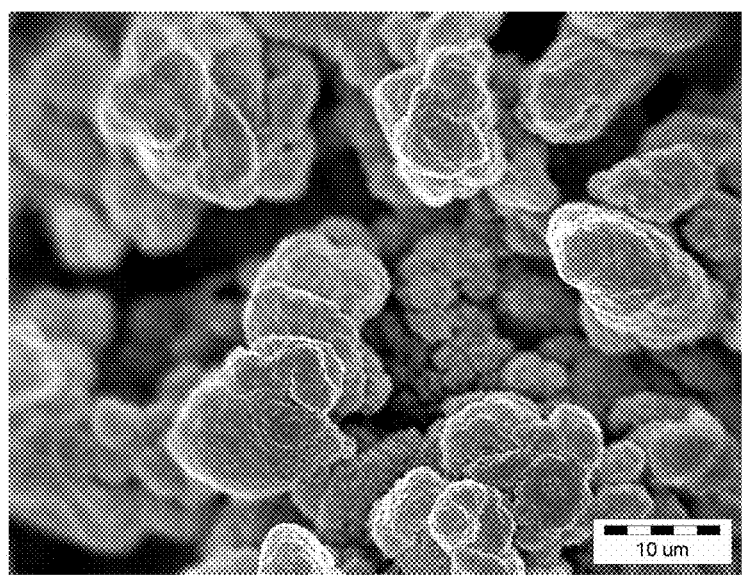
Figure 3:
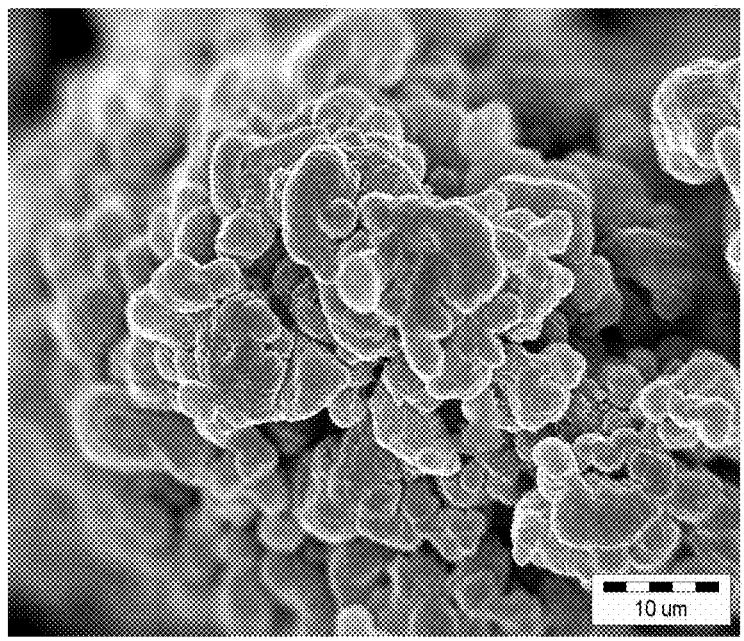
Figure 4:
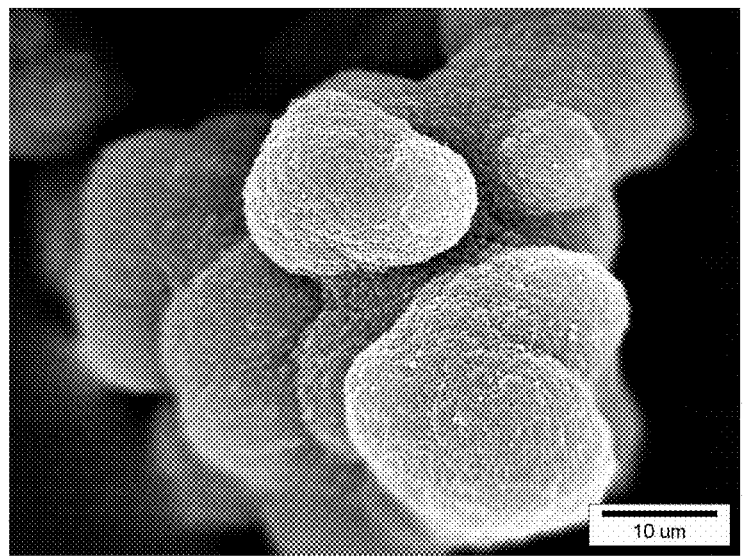

The accompanying drawings, which constitute a part of the description, are provided for further understanding the technical solution of the present disclosure and that of the prior art. The accompanying drawings describing the examples of the present disclosure are used to explain the technical solution of the present disclosure together with the examples, they should not be construed as limitations thereto. In the drawings:

FIG. 1 shows a scanning electron micrograph of ultra-high molecular weight polyethylene resin particles prepared according to example 1 of the present disclosure, FIG. 2 shows a scanning electron micrograph of ultra-high molecular weight polyethylene resin particles prepared according to example 3 of the present disclosure, FIG. 3 shows a scanning electron micrograph of ultra-high molecular weight polyethylene resin particles prepared according to example 5 of the present disclosure, and FIG. 4 shows a scanning electron micrograph of ultra-high molecular weight polyethylene resin particles prepared according to comparison example 1.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained in this manner all fall within the scope of the present disclosure.

The method and conditions for testing the characteristics and properties described in the present disclosure are as follows.

1) A bulk density is measured with a BMY-1 apparent density tester under GB/T 1636-2008 standard.

2) Measurement of molecular weight is carried out through viscometric method under the temperature of 135° C., with decalin as the solvent. The time for the polyethylene solution to flow out is measured with an Ubbelohde viscometer, and then an intrinsic viscosity η of the polymer is calculated. According to the following equation:

$$M_\gamma = 5.37 \times 10^4 \times [\eta]^{1.37}$$

$M_\gamma$ obtained is the molecular weight of the polymer.

3) A particle size and a particle-size distribution of the resin are obtained by processing micrographs taken by an optical microscope with a computer system.

4) Measurement of a tensile breaking stress: a compression molded sample is prepared according to GB/T 21461.2 standard, and the sample is tested at a stretching velocity of 50 mm/min.

5) Electron microscope: the morphology of the polymer resin is observed with an EVO18 scanning electron microscope produced by British ZEISS company, and the sample surface is processed through metal spraying.

6) Measurement of an initial crystallinity: the initial crystallinity $X_i$ of the resin is calculated according to the following equation:

$$X_i = \frac{\Delta H_f}{293} \times 100\%$$

In the above equation, $\Delta H_f$ is the melting enthalpy of the polymer, with $J \cdot g^{-1}$ being the unit. The melting enthalpy is tested through a method under GB/T 19466.3-2004 standard using a DSC 2910 produced by TA company, USA, and the value of melting enthalpy obtained from the first scanning is selected.

293 is the value of the melting enthalpy when the crystallinity of the polyethylene is 100%, the unit thereof being $J \cdot g^{-1}$.

7) The measurement of absorption amount of solvent is as follows.

(a) A centrifuge tube with absorbent cotton is used. The bottom of the centrifuge tube is a conical glass tube with a hole having a diameter of about 0.8 mm. (100±2) mg absorbent cotton is weighed in the centrifuge tube and gently pushed to the bottom thereof. The weight of the absorbent cotton and the centrifuge tube is measured to the accuracy of 0.1 mg. Subsequently, about 1 g sample is weighed in the centrifuge tube to the accuracy of 0.1 mg. 2 ml solvent (white oil or decalin) is added into the centrifuge tube with burette. And then the centrifuge tube is placed still for 10 min.

(b) Put the centrifuge tube into a sleeve, and then the sleeve is placed into a positioning hole in a rotor of a centrifuge. It should be noted that the sleeve should be placed in a well balanced position.

(c) The centrifuge is started. The centrifugal acceleration at the bottom of the sample is (11,000-13,000) m/s², and the rotation lasts for 60 min. After the centrifuge is static, the centrifuge tube is taken out and wiped off of residual solvent on the exterior wall. Afterwards, the centrifuge tube is weighed to the accuracy of 0.1 mg.

(d) Before running the test, blank sample test with no resin therein should be conducted according to the above steps.

(e) At room temperature, the grams Xs of the solvent absorbed by 100 g resin is calculated according to the following equation:

$$X_s = \frac{(m_3 - m_0) - m_2}{m_2 - m_1} \times 100$$

In the above equation:

$m_0$ is the mass of the solvent absorbed by the absorbent cotton in the blank test, the unit being g, $m_1$ is the mass of the centrifuge tube together with the absorbent cotton, the unit being g, $m_2$ is the mass of the centrifuge tube with the absorbent cotton and the resin sample, the unit being g, and $m_3$ is the mass of the solvent absorbed by the centrifuge tube having absorbent cotton and the resin sample after centrifugation, the unit being g.

8) Measurement method of the infiltration rate is as follows. 1 g ultra-high molecular weight polyethylene resin is taken and put into a 50 ml volumertric flask. Decalin solvent is added into the flask to the scale mark thereof. Subsequently, the flask is closed with a glass stopper and placed into 120° C. oil bath. In the meantime, a stopwatch is started and the time for the components in the solvent to disappear visually is recorded.

9) The resin according to the present disclosure can be manufactured into ultra-high molecular weight polyethylene fibers through dry process or wet process. Typical manufacturing process is as follows. Ultra-high molecular weight polyethylene resin is dissolved in decalin, and is extruded through a twin screw extruder, and is subsequently spun with a round single hole spinneret. The same process can be applied to various samples. The highest spinning temperature is 260 to 280° C. The gel fibers of the sample obtained are sufficiently extracted in an extraction agent, and then tensioned and dried. The dry gel fibers are used in the next step, i.e., ultra thermal drawing. Three-level drawing technology is adopted, with the temperatures of the three levels respectively being 80° C. for the first level, 100° C. for the second level, and 120° C. for the third level.

Example 1

(1) Preparation of Ultra-High Molecular Weight Polyethylene Catalyst

In inert atmosphere, 1 g magnesium chloride is dispersed in n-hexane. N-butanol is added for reaction at 70° C., thereby forming magnesium chloride-alcohol adduct solution or dispersoid. Subsequently, aluminum diethyl monochloride is added to react with the magnesium chloride-alcohol adduct, forming an intermediate product. The intermediate product is treated with ultrasound in an ultrasonic device. Titanium tetrachloride is added for a Ti loading reaction. Afterwards, said Ti loading reaction mixture is treated with ultrasound in the ultrasonic device. Finally, solid particles are recycled and the ultra-high molecular weight polyethylene catalyst is obtained.

(2) Preparation of the Ultra-High Molecular Weight Polyethylene Resin.

After nitrogen purging in a polymerization reactor, solvent is added therein, and stirring is started. Then, 4 ml co-catalyst triethyl aluminum and 1.5 mg main catalyst prepared according to the above steps are added in sequence. The stirring speed is 210 rpm, and the polymerization temperature is raised to 60° C. Vinyl monomer is injected into the reactor. The pressure in the reactor is raised to 0.6 MPa. In the meantime, the pressure and temperature in the reactor are maintained constant. After the reaction proceeds for 1 hr, resin particles generated suspend in the solvent, thereby forming polymer slurry in the solvent. Finally, after the solvent is removed from the polymer slurry, the ultra-high molecular weight polyethylene resin required is obtained.

The properties of the ultra-high molecular weight polyethylene resin obtained are as shown in Table I, and the scanning electron micrograph of the resin particles is as shown in FIG. 1.

(3) Spinning Test is Conducted on the Polymer Resin Through the Following Process Ultra-high molecular weight polyethylene resin is dissolved in decalin. Subsequently, the ultra-high molecular weight polyethylene resin is extruded through a twin screw extruder and spun with a round single hole spinneret. The same process can be applied to various samples. The highest spinning temperature is 260 to 280° C. The gel fibers of the sample obtained are sufficiently extracted in the extraction agent, and then tensioned and dried. The dry gel fibers are used in the next step, i.e., ultra thermal drawing. Three-level drawing technology is adopted, with the temperatures of the three levels respectively being 80° C. for the first level, 100° C. for the second level, and 120° C. for the third level. The spinning performances are as shown in Table II.

Example 2

(1) Preparation of Ultra-High Molecular Weight Polyethylene Catalyst

In inert atmosphere, 1 g magnesium chloride is dispersed in n-hexane. N-butanol is added for reaction at 70° C., thereby forming magnesium chloride-alcohol adduct solution or dispersoid. Subsequently, aluminum diethyl monochloride is added to react with the magnesium chloride-alcohol adduct, forming an intermediate product. The intermediate product is treated with ultrasound in an ultrasonic device. Titanium tetrachloride is added for a Ti loading reaction. Afterwards, said Ti loading reaction mixture is treated with ultrasound in the ultrasonic device. Finally, solid particles are recycled, and the ultra-high molecular weight polyethylene catalyst is obtained.

(2) Preparation of the Ultra-High Molecular Weight Polyethylene Resin

After nitrogen purging in a polymerization reactor, solvent is added therein, and stirring is started. Then, 4 ml co-catalyst triethyl aluminum and 1.5 mg said main catalyst are added in sequence. The stirring speed is 210 rpm, and the polymerization temperature is raised to 55° C. Vinyl monomer is injected into the reactor. The pressure in the reactor is raised to 0.6 MPa. In the meantime, the pressure and temperature in the reactor are maintained constant. After the reaction proceeds for 1 hr, resin particles generated suspend in the solvent, thereby forming polymer slurry in the solvent. Finally, after the solvent is removed from the polymer slurry, the ultra-high molecular weight polyethylene resin required is obtained.

The properties of the ultra-high molecular weight polyethylene resin obtained are as shown in Table I.

Example 3

(1) Preparation of Ultra-High Molecular Weight Polyethylene Catalyst

In inert atmosphere, 1 g magnesium chloride is dispersed in n-hexane. N-butanol is added for reaction at 70° C., thereby forming magnesium chloride-alcohol adduct solution or dispersoid. Subsequently, aluminum diethyl monochloride is added to react with the magnesium chloride-alcohol adduct, forming an intermediate product. The intermediate product is treated with ultrasound in an ultrasonic device. Titanium tetrachloride is added for a Ti loading reaction. Afterwards, said Ti loading reaction mixture is treated with ultrasound in the ultrasonic device. Finally, solid particles are recycled, and the ultra-high molecular weight polyethylene catalyst is obtained.

(2) Preparation of the Ultra-High Molecular Weight Polyethylene Resin

After nitrogen purging in a polymerization reactor, solvent is added therein, and stirring is started. Then, 4 ml co-catalyst triethyl aluminum and 1.5 mg said main catalyst are added in sequence. The stirring speed is 210 rpm, and the polymerization temperature is raised to 65° C. Vinyl monomer is injected into the reactor. The pressure in the reactor is raised to 0.6 MPa. In the meantime, the pressure and temperature in the reactor are maintained constant. After the reaction proceeds for 1 hr, resin particles generated suspend in the solvent, thereby forming polymer slurry in the solvent. Finally, after the solvent is removed from the polymer slurry, the ultra-high molecular weight polyethylene resin required is obtained.

The properties of the ultra-high molecular weight polyethylene resin obtained are as shown in Table I, and the scanning electron micrograph of the resin particles is as shown in FIG. 2.

(3) Spinning Test is Conducted on the Polymer Resin Through the Following Process Ultra-high molecular weight polyethylene resin is dissolved in decalin. Subsequently, the ultra-high molecular weight polyethylene resin is extruded through a twin screw extruder and spun with a round single hole spinneret. The same process can be applied to various samples. The highest spinning temperature is 260 to 280° C. The gel fibers of the sample obtained are sufficiently extracted in the extraction agent, and then tensioned and dried. The dry gel fibers are used in the next step, i.e., ultra thermal drawing. Three-level drawing technology is adopted, with the temperatures of the three levels respectively being 80° C. for the first level, 100° C. for the second level, and 120° C. for the third level. The spinning performance is as shown in Table II.

Example 4

(1) Preparation of Ultra-High Molecular Weight Polyethylene Catalyst

In inert atmosphere, 1 g magnesium chloride is dispersed in n-hexane. N-butanol is added for reaction at 70° C., thereby forming magnesium chloride-alcohol adduct solution or dispersoid. Subsequently, aluminum diethyl monochloride is added to react with the magnesium chloride-alcohol adduct, forming an intermediate product. The intermediate product is treated with ultrasound in an ultrasonic device. Titanium tetrachloride is added for a Ti loading reaction. Afterwards, said Ti loading reaction mixture is treated with ultrasound in the ultrasonic device. Finally, solid particles are recycled and the ultra-high molecular weight polyethylene catalyst is obtained.

(2) Preparation of the Ultra-High Molecular Weight Polyethylene Resin

After nitrogen purging in a polymerization reactor, solvent is added therein, and stirring is started. Then, 4 ml co-catalyst triethyl aluminum and 1.5 mg said main catalyst are added in sequence. The stirring speed is 210 rpm, and the polymerization temperature is raised to 72° C. Vinyl monomer is injected into the reactor. The pressure in the reactor is raised to 0.6 MPa. In the meantime, the pressure and temperature in the reactor are maintained constant. After the reaction proceeds for 1 hr, resin particles generated suspend in the solvent, thereby forming polymer slurry in the solvent. Finally, after the solvent is removed from the polymer slurry, the ultra-high molecular weight polyethylene resin required is obtained.

The properties of the ultra-high molecular weight polyethylene resin obtained are as shown in Table I.

(3) Spinning Test is Conducted on the Polymer Resin Through the Following Process Ultra-high molecular weight polyethylene resin is dissolved in decalin Subsequently, the ultra-high molecular weight polyethylene resin is extruded through a twin screw extruder and spun with a round single hole spinneret. The same process can be applied to various samples. The highest spinning temperature is 260 to 280° C. The gel fibers of the sample obtained are sufficiently extracted in the extraction agent, and then tensioned and dried. The dry gel fibers are used in the next step, i.e., ultra thermal drawing. Three-level drawing technology is adopted, with the temperatures of the three levels respectively being 80° C. for the first level, 100° C. for the second level, and 120° C. for the third level. The spinning performances are as shown in Table II.

Example 5

(1) Preparation of Ultra-High Molecular Weight Polyethylene Catalyst

In inert atmosphere, 1 g magnesium chloride is dispersed in n-hexane. N-butanol is added for reaction at 70° C., thereby forming magnesium chloride-alcohol adduct solution or dispersoid. Subsequently, aluminum diethyl monochloride is added to react with the magnesium chloride-alcohol adduct, forming an intermediate product. The intermediate product is treated with ultrasound in an ultrasonic device. Titanium tetrachloride is added for a Ti loading reaction. Afterwards, said Ti loading reaction mixture is treated with ultrasound in the ultrasonic device. Finally, solid particles are recycled and the ultra-high molecular weight polyethylene catalyst is obtained.

(2) Preparation of the Ultra-High Molecular Weight Polyethylene Resin

After nitrogen purging in a polymerization reactor, solvent is added therein, and stirring is started. Then, 4 ml co-catalyst triethyl aluminum and 1.5 mg said main catalyst are added in sequence. The stirring speed is 210 rpm, and the polymerization temperature is raised to 60° C. Vinyl monomer is injected into the reactor. The pressure in the reactor is raised to 0.4 MPa. In the meantime, the pressure and temperature in the reactor are maintained constant. After the reaction proceeds for 1 hr, resin particles generated suspend in the solvent, thereby forming polymer slurry in the solvent. Finally, after the solvent is removed from the polymer slurry, the ultra-high molecular weight polyethylene resin required is obtained.

The properties of the ultra-high molecular weight polyethylene resin obtained are as shown in Table I, and the scanning electron micrograph of the resin particles is as shown in FIG. 3.

Example 6

(1) Preparation of Ultra-High Molecular Weight Polyethylene Catalyst

In inert atmosphere, 1 g magnesium chloride is dispersed in n-hexane. N-butanol is added for reaction at 70° C., thereby forming magnesium chloride-alcohol adduct solution or dispersoid. Subsequently, aluminum diethyl monochloride is added to react with the magnesium chloride-alcohol adduct, forming an intermediate product. The intermediate product is treated with ultrasound in an ultrasonic device. Titanium tetrachloride is added for a Ti loading reaction. Afterwards, said Ti loading reaction mixture is treated with ultrasound in the ultrasonic device. Finally, solid particles are recycled and the ultra-high molecular weight polyethylene catalyst is obtained.

(2) Preparation of the Ultra-High Molecular Weight Polyethylene Resin

After nitrogen purging in a polymerization reactor, solvent is added therein, and stirring is started. Then, 4 ml co-catalyst triethyl aluminum and 1.5 mg said main catalyst are added in sequence. The stirring speed is 210 rpm, and the polymerization temperature is raised to 60° C. Vinyl monomer is injected into the reactor. The pressure in the reactor is raised to 0.8 MPa. In the meantime, the pressure and temperature in the reactor are maintained constant. After the reaction proceeds for 1 hr, resin particles generated suspend in the solvent, thereby forming polymer slurry in the solvent. Finally, after the solvent is removed from the polymer slurry, the ultra-high molecular weight polyethylene resin required is obtained.

The properties of the ultra-high molecular weight polyethylene resin obtained are as shown in Table I.

Example 7

(1) Preparation of Ultra-High Molecular Weight Polyethylene Catalyst

In inert atmosphere, 1 g magnesium chloride is dispersed in n-hexane. N-butanol is added for reaction at 70° C., thereby forming magnesium chloride-alcohol adduct solution or dispersoid. Subsequently, aluminum diethyl monochloride is added to react with the magnesium chloride-alcohol adduct, forming an intermediate product. The intermediate product is treated with ultrasound in an ultrasonic device. Titanium tetrachloride is added for a Ti loading reaction. Afterwards, said Ti loading reaction mixture is treated with ultrasound in the ultrasonic device. Finally, solid particles are recycled and the ultra-high molecular weight polyethylene catalyst is obtained.

(2) Preparation of the Ultra-High Molecular Weight Polyethylene Resin

After nitrogen purging in a polymerization reactor, solvent is added therein, and stirring is started. Then, 4 ml co-catalyst triethyl aluminum and 1.5 mg said main catalyst are added in sequence. The stirring speed is 210 rpm, and the polymerization temperature is raised to 60° C. Vinyl monomer is injected into the reactor. The pressure in the reactor is raised to 1.0 MPa. In the meantime, the pressure and temperature in the reactor are maintained constant. After the reaction proceeds for 1 hr, resin particles generated suspend in the solvent, thereby forming polymer slurry in the solvent. Finally, after the solvent is removed from the polymer slurry, the ultra-high molecular weight polyethylene resin required is obtained.

The properties of the ultra-high molecular weight polyethylene resin obtained are as shown in Table I.

Example 8

(1) Preparation of Ultra-High Molecular Weight Polyethylene Catalyst

In inert atmosphere, 1 g magnesium chloride is dispersed in n-hexane. N-butanol is added for reaction at 70° C., thereby forming magnesium chloride-alcohol adduct solution or dispersoid. Subsequently, aluminum diethyl monochloride is added to react with the magnesium chloride-alcohol adduct, forming an intermediate product. The intermediate product is treated with ultrasound in an ultrasonic device. Titanium tetrachloride is added for a Ti loading reaction. Afterwards, said Ti loading reaction mixture is treated with ultrasound in the ultrasonic device. Finally, solid particles are recycled and the ultra-high molecular weight polyethylene catalyst is obtained.

(2) Preparation of the Ultra-High Molecular Weight Polyethylene Resin

After nitrogen purging in a polymerization reactor, solvent is added therein, and stirring is started. Then, 4 ml co-catalyst triethyl aluminum and 0.5 mg said main catalyst are added in sequence. The stirring speed is 210 rpm, and the polymerization temperature is raised to 60° C. Vinyl monomer is injected into the reactor. The pressure in the reactor is raised to 0.6 MPa. In the meantime, the pressure and temperature in the reactor are maintained constant. After the reaction proceeds for 1 hr, resin particles generated suspend in the solvent, thereby forming polymer slurry in the solvent. Finally, after the solvent is removed from the polymer slurry, the ultra-high molecular weight polyethylene resin required is obtained.

The properties of the ultra-high molecular weight polyethylene resin obtained are as shown in Table I.

Example 9

(1) Preparation of Ultra-High Molecular Weight Polyethylene Catalyst

In inert atmosphere, 1 g magnesium chloride is dispersed in n-hexane. N-butanol is added for reaction at 70° C., thereby forming magnesium chloride-alcohol adduct solution or dispersoid. Subsequently, aluminum diethyl monochloride is added to react with the magnesium chloride-alcohol adduct, forming an intermediate product. The intermediate product is treated with ultrasound in an ultrasonic device. Titanium tetrachloride is added for a Ti loading reaction. Afterwards, said Ti loading reaction mixture is treated with ultrasound in the ultrasonic device. Finally, solid particles are recycled and the ultra-high molecular weight polyethylene catalyst is obtained.

(2) Preparation of the Ultra-High Molecular Weight Polyethylene Resin

After nitrogen purging in a polymerization reactor, solvent is added therein, and stirring is started. Then, 4 ml co-catalyst triethyl aluminum and 1.0 mg said main catalyst are added in sequence. The stirring speed is 210 rpm, and the polymerization temperature is raised to 60° C. Vinyl monomer is injected into the reactor. The pressure in the reactor is raised to 0.6 MPa. In the meantime, the pressure and temperature in the reactor are maintained constant. After the reaction proceeds for 1 hr, resin particles generated suspend in the solvent, thereby forming polymer slurry in the solvent. Finally, after the solvent is removed from the polymer slurry, the ultra-high molecular weight polyethylene resin required is obtained.

The properties of the ultra-high molecular weight polyethylene resin obtained are as shown in Table I.

Example 10

(1) Preparation of Ultra-High Molecular Weight Polyethylene Catalyst

In inert atmosphere, 1 g magnesium chloride is dispersed in n-hexane. N-butanol is added for reaction at 70° C., thereby forming magnesium chloride-alcohol adduct solution or dispersoid. Subsequently, aluminum diethyl monochloride is added to react with the magnesium chloride-alcohol adduct, forming an intermediate product. The intermediate product is treated with ultrasound in an ultrasonic device. Titanium tetrachloride is added for a Ti loading reaction. Afterwards, said Ti loading reaction mixture is treated with ultrasound in the ultrasonic device. Finally, solid particles are recycled and the ultra-high molecular weight polyethylene catalyst is obtained.

(2) Preparation of the Ultra-High Molecular Weight Polyethylene Resin

After nitrogen purging in a polymerization reactor, solvent is added therein, and stirring is started. Then, 4 ml co-catalyst triethyl aluminum and 2.0 mg said main catalyst are added in sequence. The stirring speed is 210 rpm, and the polymerization temperature is raised to 60° C. Vinyl monomer is injected into the reactor. The pressure in the reactor is raised to 0.6 MPa. In the meantime, the pressure and temperature in the reactor are maintained constant. After the reaction proceeds for 1 hr, resin particles generated suspend in the solvent, thereby forming polymer slurry in the solvent. Finally, after the solvent is removed from the polymer slurry, the ultra-high molecular weight polyethylene resin required is obtained.

The properties of the ultra-high molecular weight polyethylene resin obtained are as shown in Table I.

Example 11

(1) Preparation of Ultra-High Molecular Weight Polyethylene Catalyst

In inert atmosphere, 1 g magnesium chloride is dispersed in n-hexane. N-butanol is added for reaction at 70° C., thereby forming magnesium chloride-alcohol adduct solution or dispersoid. Subsequently, aluminum diethyl monochloride is added to react with the magnesium chloride-alcohol adduct, forming an intermediate product. The intermediate product is treated with ultrasound in an ultrasonic device. Titanium tetrachloride is added for a Ti loading reaction. Afterwards, said Ti loading reaction mixture is treated with ultrasound in the ultrasonic device. Finally, solid particles are recycled and the ultra-high molecular weight polyethylene catalyst is obtained.

(2) Preparation of the Ultra-High Molecular Weight Polyethylene Resin

After nitrogen purging in a polymerization reactor, solvent is added therein, and stirring is started. Then, 4 ml co-catalyst triethyl aluminum and 2.5 mg said main catalyst added in sequence. The stirring speed is 210 rpm, and the polymerization temperature is raised to 60° C. Vinyl monomer is injected into the reactor. The pressure in the reactor is raised to 0.6 MPa. In the meantime, the pressure and temperature in the reactor are maintained constant. After the reaction proceeds for 1 hr, resin particles generated suspend in the solvent, thereby forming polymer slurry in the solvent. Finally, after the solvent is removed from the polymer slurry, the ultra-high molecular weight polyethylene resin required is obtained.

The properties of the ultra-high molecular weight polyethylene resin obtained are as shown in Table I.

Example 12

(1) Preparation of Ultra-High Molecular Weight Polyethylene Catalyst

In inert atmosphere, 1 g magnesium chloride is dispersed in n-hexane. N-butanol is added for reaction at 70° C., thereby forming magnesium chloride-alcohol adduct solution or dispersoid. Subsequently, aluminum diethyl monochloride is added to react with the magnesium chloride-alcohol adduct, forming an intermediate product. The intermediate product is treated with ultrasound in an ultrasonic device. Titanium tetrachloride is added for a Ti loading reaction. Afterwards, said Ti loading reaction mixture is treated with ultrasound in the ultrasonic device. Finally, solid particles are recycled and the ultra-high molecular weight polyethylene catalyst is obtained.

(2) Preparation of the Ultra-High Molecular Weight Polyethylene Resin

After nitrogen purging in a polymerization reactor, solvent is added therein, and stirring is started. Then, 3 ml co-catalyst triethyl aluminum and 1.5 mg said main catalyst are added in sequence. The stirring speed is 210 rpm, and the polymerization temperature is raised to 60° C. Vinyl monomer is injected into the reactor. The pressure in the reactor is raised to 0.6 MPa. In the meantime, the pressure and temperature in the reactor are maintained constant. After the reaction proceeds for 1 hr, resin particles generated suspend in the solvent, thereby forming polymer slurry in the solvent. Finally, after the solvent is removed from the polymer slurry, the ultra-high molecular weight polyethylene resin required is obtained.

The properties of the ultra-high molecular weight polyethylene resin obtained are as shown in Table I.

Example 13

(1) Preparation of Ultra-High Molecular Weight Polyethylene Catalyst

In inert atmosphere, 1 g magnesium chloride is dispersed in n-hexane. N-butanol is added for reaction at 70° C., thereby forming magnesium chloride-alcohol adduct solution or dispersoid. Subsequently, aluminum diethyl monochloride is added to react with the magnesium chloride-alcohol adduct, forming an intermediate product. The intermediate product is treated with ultrasound in an ultrasonic device. Titanium tetrachloride is added for a Ti loading reaction. Afterwards, said Ti loading reaction mixture is treated with ultrasound in the ultrasonic device. Finally, solid particles are recycled and the ultra-high molecular weight polyethylene catalyst is obtained.

(2) Preparation of the Ultra-High Molecular Weight Polyethylene Resin

After nitrogen purging in a polymerization reactor, solvent is added therein, and stirring is started. Then, 5 ml co-catalyst triethyl aluminum and 1.5 mg said main catalyst are added in sequence. The stirring speed is 210 rpm, and the polymerization temperature is raised to 60° C. Vinyl monomer is injected into the reactor. The pressure in the reactor is raised to 0.6 MPa. N the meantime, the pressure and temperature in the reactor are maintained constant. After the reaction proceeds for 1 hr, resin particles generated suspend in the solvent, thereby forming polymer slurry in the solvent. Finally, after the solvent is removed from the polymer slurry, the ultra-high molecular weight polyethylene resin required is obtained.

The properties of the ultra-high molecular weight polyethylene resin obtained are as shown in Table I.

Example 14

(1) Preparation of Ultra-High Molecular Weight Polyethylene Catalyst

In inert atmosphere, 1 g magnesium chloride is dispersed in n-hexane. N-butanol is added for reaction at 70° C., thereby forming magnesium chloride-alcohol adduct solution or dispersoid. Subsequently, aluminum diethyl monochloride is added to react with the magnesium chloride-alcohol adduct, forming an intermediate product. The intermediate product is treated with ultrasound in an ultrasonic device. Titanium tetrachloride is added for a Ti loading reaction. Afterwards, said Ti loading reaction mixture is treated with ultrasound in the ultrasonic device. Finally, solid particles are recycled and the ultra-high molecular weight polyethylene catalyst is obtained.

(2) Preparation of the Ultra-High Molecular Weight Polyethylene Resin

After nitrogen purging in a polymerization reactor, solvent is added therein, and stirring is started. Then, 4 ml co-catalyst triethyl aluminum and 1.5 mg said main catalyst are added in sequence. The stirring speed is 210 rpm, and the polymerization temperature is raised to 60° C. Vinyl monomer is injected into the reactor. The pressure in the reactor is raised to 0.6 MPa. In the meantime, the pressure and temperature in the reactor are maintained constant. After the reaction proceeds for 2 hr, resin particles generated suspend in the solvent, thereby forming polymer slurry in the solvent. Finally, after the solvent is removed from the polymer slurry, the ultra-high molecular weight polyethylene resin required is obtained.

The properties of the ultra-high molecular weight polyethylene resin obtained are as shown in Table I.

Example 15

(1) Preparation of Ultra-High Molecular Weight Polyethylene Catalyst

In inert atmosphere, 1 g magnesium chloride is dispersed in n-hexane. N-butanol is added for reaction at 70° C., thereby forming magnesium chloride-alcohol adduct solution or dispersoid. Subsequently, aluminum diethyl monochloride is added to react with the magnesium chloride-alcohol adduct, forming an intermediate product. The intermediate product is treated with ultrasound in an ultrasonic device. Titanium tetrachloride is added for a Ti loading reaction. Afterwards, said Ti loading reaction mixture is treated with ultrasound in the ultrasonic device. Finally, solid particles are recycled and the ultra-high molecular weight polyethylene catalyst is obtained.

(2) Preparation of the Ultra-High Molecular Weight Polyethylene Resin

After nitrogen purging in a polymerization reactor, solvent is added therein, and stirring is started. Then, 4 ml co-catalyst triethyl aluminum and 0.5 mg said main catalyst are added in sequence. The stirring speed is 300 rpm, and the polymerization temperature is raised to 60° C. Vinyl monomer is injected into the reactor. The pressure in the reactor is raised to 0.6 MPa. In the meantime, the pressure and temperature in the reactor are maintained constant. After the reaction proceeds for 1 hr, resin particles generated suspend in the solvent, thereby forming polymer slurry in the solvent. Finally, after the solvent is removed from the polymer slurry, the ultra-high molecular weight polyethylene resin required is obtained.

The properties of the ultra-high molecular weight polyethylene resin obtained are as shown in Table I.

Comparison Example 1

A commercially available ultra-high molecular weight polyethylene resin A is used for a spinning test. The molecular weight of resin A is 1.85 million. The spinning process is the same as that described in example 1. The properties of the resin, which are obtained through the test method according to the present disclosure, are as shown in Table I, and the spinning performance thereof is as shown in Table II. The scanning electron micrograph of the resin of the present comparison example is as shown in FIG. 4.

As shown in FIG. 1, as compared with comparison example 1, the resin particles in example 1, example 3 and example 5 are characterized by uniform particle morphology and containing less large particles and fine particles therein. There are plenty of cracks and gyms-like structures on the resin particles, in which case, it is easy for the solvent to infiltrate into the particles, thereby the swelling and dissolving time of the particles can be significantly shortened.

Comparison Example 2

A commercially available ultra-high molecular weight polyethylene resin B is used for a spinning test. The molecular weight of resin B is 2.77 million. The spinning process is the same as that described in example 1. The properties of the resin, which are obtained through the test method according to the present disclosure, are as shown in Table I, and the spinning performance thereof is as shown in Table II.

Comparison Example 3

A commercially available ultra-high molecular weight polyethylene resin C is used for spinning test. The molecular weight of resin C is 3.59 million. The spinning process is the same as that described in example 1. The properties of the resin, which are obtained through the test method according to the present disclosure, are as shown in Table I, and the spinning performance thereof is as shown in Table II.

Comparison Example 4

A commercially available ultra-high molecular weight polyethylene resin D is used for a spinning test. The molecular weight of resin D is 4.33 million. The spinning process is the same as that described in example 1. The properties of the resin, which are obtained through the test method according to the present disclosure, are as shown in Table I, and the spinning performance thereof is as shown in Table II.

Table I shows the properties of the ultra-high molecular weight polyethylene resin in the examples and those in the comparison examples.

TABLE I

| | Initial crystallinity % | Average particle size μm | Particle size distribution | Infiltration time Min | Molecular weight $10^4$ | Solvent absorption amount g | | Bulk density g/cm$^3$ | Tensile breaking stress MPa |
|---|---|---|---|---|---|---|---|---|---|
| | | | | | | Decalin | White oil | | |
| Example 1 | 69.4 | 177 | 1.69 | 9 | 550 | 16.42 | 20.57 | 0.27 | 36.7 |
| Example 2 | 72.1 | 183 | 1.78 | 8 | 623 | 21.75 | 23.45 | 0.26 | 37.3 |
| Example 3 | 67.3 | 185 | 1.74 | 10 | 434 | 14.38 | 17.12 | 0.29 | 35.8 |

TABLE I-continued

|  | Initial crystallinity % | Average particle size μm | Particle size distribution | Infiltration time Min | Molecular weight 10⁴ | Solvent absorption amount g Decalin | Solvent absorption amount g White oil | Bulk density g/cm³ | Tensile breaking stress MPa |
|---|---|---|---|---|---|---|---|---|---|
| Example 4 | 63.6 | 182 | 1.84 | 9 | 303 | 15.72 | 17.99 | 0.31 | 34.9 |
| Example 5 | 68.7 | 168 | 1.79 | 10 | 535 | 13.88 | 15.72 | 0.27 | 36.2 |
| Example 6 | 69.3 | 175 | 1.65 | 9 | 568 | 16.01 | 19.01 | 0.28 | 35.9 |
| Example 7 | 68.2 | 190 | 1.75 | 9 | 520 | 16.59 | 18.93 | 0.27 | 36.5 |
| Example 8 | 69.1 | 187 | 1.81 | 10 | 379 | 12.11 | 14.87 | 0.30 | 36.7 |
| Example 9 | 68.7 | 174 | 1.84 | 11 | 499 | 9.57 | 14.22 | 0.29 | 36.1 |
| Example 10 | 69.5 | 193 | 1.73 | 9 | 425 | 17.54 | 20.14 | 0.25 | 35.9 |
| Example 11 | 67.9 | 175 | 1.69 | 9 | 378 | 16.89 | 19.43 | 0.23 | 36.8 |
| Example 12 | 68.3 | 183 | 1.88 | 10 | 520 | 15.34 | 19.67 | 0.25 | 36.2 |
| Example 13 | 69.1 | 186 | 1.82 | 8 | 407 | 19.56 | 23.79 | 0.29 | 35.9 |
| Example 14 | 67.4 | 180 | 1.77 | 9 | 504 | 16.29 | 18.89 | 0.28 | 36.2 |
| Example 15 | 68.8 | 179 | 1.79 | 9 | 517 | 15.03 | 18.04 | 0.26 | 36.7 |
| Comparison example 1 | 57.8 | 226 | 2.17 | 12 | 185 | 4.11 | 9.31 | 0.29 | 30.1 |
| Comparison example 2 | 58.3 | 205 | 2.14 | 12 | 277 | 3.95 | 7.04 | 0.39 | 31.7 |
| Comparison example 3 | 57.9 | 221 | 2.23 | 12 | 359 | 4.07 | 8.50 | 0.41 | 32.5 |
| Comparison example 4 | 59.0 | 209 | 2.19 | 13 | 433 | 3.77 | 6.92 | 0.40 | 32.7 |

Table II shows the spinning performance of fibers in the examples and in the comparison examples.

TABLE II

| Sample | | Fineness dtex | Tensile breaking stress cN/dtex | Modulus cN/dtex | Elongation at break % |
|---|---|---|---|---|---|
| Example 1 | First level drawing | 18 | 14.2 | 450.7 | 4.79 |
|  | Second level drawing | 13 | 24.7 | 869.3 | 3.62 |
|  | Third level drawing | 11 | 28.0 | 1084.7 | 3.39 |
| Example 3 | First level drawing | 20 | 13.9 | 398.9 | 4.71 |
|  | Second level drawing | 16 | 23.5 | 780.4 | 4.03 |
|  | Third level drawing | 13 | 26.4 | 937.6 | 3.86 |
| Example 4 | First level drawing | 22 | 13.0 | 392.3 | 4.16 |
|  | Second level drawing | 17 | 21.7 | 682.4 | 3.89 |
|  | Third level drawing | 15 | 25.0 | 870.8 | 3.25 |
| Comparison example 1 | First level drawing | 28 | 10.8 | 280.8 | 3.75 |
|  | Second level drawing | 26 | 15.4 | 378.5 | 3.56 |
|  | Third level drawing | 23 | 18.7 | 502.4 | 3.24 |
| Comparison example 2 | First level drawing | 25 | 12.4 | 331.2 | 3.84 |
|  | Second level drawing | 22 | 16.7 | 450.1 | 3.67 |
|  | Third level drawing | 18 | 19.5 | 606.8 | 3.41 |
| Comparison example 3 | First level drawing | 23 | 13.9 | 370.3 | 3.92 |
|  | Second level drawing | 20 | 17.3 | 580.1 | 3.78 |
|  | Third level drawing | 16 | 20.6 | 795.4 | 3.56 |
| Comparison example 4 | First level drawing | 19 | 14.4 | 399.2 | 4.01 |
|  | Second level drawing | 16 | 18.6 | 645.6 | 3.84 |
|  | Third level drawing | 14 | 22.1 | 858.9 | 3.66 |

According to Table I and Table II, as compared with the comparison examples, the resin according to any example of the present disclosure has relatively high initial crystallinity, proper average particle size, relatively narrow particle-size distribution, and controllable molecular weight. In the meantime, the tensile breaking stress of the resin is significantly improved, and the solvent absorption amount thereof is increased. As a result, in the fiber spinning process, the resin can dissolve rapidly, and the fibers obtained have higher strength and higher modulus.

The invention claimed is:

1. An ultra-high molecular weight polyethylene resin, wherein the polyethylene resin has a viscosity average molecular weight in a range from 2 to 7 million, a volume average particle size in a range from 100 to 350 μm, a particle-size distribution in a range from 1.0 to 2.1, a tensile breaking stress in a range from 30 to 60 MPa, a bulk density of resin in a range from 0.10 to 0.50 g/cm³, and an initial crystallinity in a range from 60.5 to 90%.

2. The ultra-high molecular weight polyethylene resin according to claim 1, wherein a decalin absorption amount of the ultra-high molecular weight polyethylene resin is in a range from 2 to 50 g per 100 g of ultra-high molecular weight polyethylene resin, and a white oil absorption amount of the ultra-high molecular weight polyethylene resin is in a range from 5 to 60 g per 100 g of ultra-high molecular weight polyethylene resin.

3. The ultra-high molecular weight polyethylene resin according to claim 1, wherein the initial crystallinity of the ultra-high molecular weight polyethylene resin is in a range from 63 to 85%.

4. The ultra-high molecular weight polyethylene resin according to claim 1, wherein an infiltration time of resin particles in solvent decalin is in a range from 0.5 to 11 min.

5. The ultra-high molecular weight polyethylene resin according to claim 4, wherein an infiltration time of resin particles in solvent decalin is in a range from 1 to 8 min.

6. The ultra-high molecular weight polyethylene resin according to claim 5, wherein the bulk density of the ultra-high molecular weight polyethylene resin is in a range from 0.20 to 0.35 g/cm$^3$.

7. The ultra-high molecular weight polyethylene resin according to claim 1, wherein the viscosity average molecular weight of the ultra-high molecular weight polyethylene resin is in a range from 2.5 to 6 million.

8. The ultra-high molecular weight polyethylene resin according to claim 7, wherein the viscosity average molecular weight of the ultra-high molecular weight polyethylene resin is in a range from 3.5 to 5.5 million.

9. The ultra-high molecular weight polyethylene resin according to claim 1, wherein the average particle size of the ultra-high molecular weight polyethylene resin is in a range from 150 to 250 μm.

10. The ultra-high molecular weight polyethylene resin according to claim 1, wherein the particle-size distribution of the ultra-high molecular weight polyethylene resin is in a range from 1.2 to 2.0.

11. The ultra-high molecular weight polyethylene resin according to claim 10, wherein the particle-size distribution of the ultra-high molecular weight polyethylene resin is in a range from 1.4 to 1.9.

12. The ultra-high molecular weight polyethylene resin according to claim 1, wherein the bulk density of the ultra-high molecular weight polyethylene resin is in a range from 0.20 to 0.45 g/cm$^3$.

13. The ultra-high molecular weight polyethylene resin according to claim 1, wherein the tensile breaking stress of the ultra-high molecular weight polyethylene resin is in a range from 32 to 60 MPa.

14. The ultra-high molecular weight polyethylene resin according to claim 13, wherein the tensile breaking stress of the ultra-high molecular weight polyethylene resin is in a range from 35 to 60 MPa.

15. A method for producing a polymeric fiber, comprising:
    mixing the ultra-high molecular weight polyethylene resin of claim 1 with a solvent; and
    spinning the mixture into a fiber.

* * * * *